United States Patent [19]

Bell et al.

[11] 4,177,496

[45] Dec. 4, 1979

[54] CAPACITIVE PRESSURE TRANSDUCER

[75] Inventors: Robert L. Bell, Chatsworth; Robert Willing, Anaheim; Fred Kavli, Woodland Hills, all of Calif.

[73] Assignee: Kavlico Corporation, Chatsworth, Calif.

[21] Appl. No.: 834,498

[22] Filed: Sep. 19, 1977

Related U.S. Application Data

[63] Continuation of Ser. No. 666,188, Mar. 12, 1976, abandoned.

[51] Int. Cl.² ............................................. H01G 7/00
[52] U.S. Cl. ...................................... 361/283; 73/724
[58] Field of Search ................. 179/111 R; 361/283; 73/724, 718; 174/525

[56] References Cited

U.S. PATENT DOCUMENTS

| | | | |
|---|---|---|---|
| 2,571,507 | 10/1951 | Welch | 361/283 X |
| 3,376,376 | 4/1968 | Smith | 174/525 X |
| 3,405,559 | 10/1968 | Moffatt | 361/283 X |
| 3,634,727 | 1/1972 | Polye | 361/283 X |
| 3,715,638 | 2/1973 | Poyle | 361/283 |
| 3,748,571 | 7/1973 | Kurtz | 361/283 X |
| 3,750,476 | 8/1973 | Brown | 73/724 |
| 3,808,480 | 4/1974 | Johnston | 361/283 |
| 3,993,939 | 11/1976 | Slavin | 361/283 |

FOREIGN PATENT DOCUMENTS 2021479  11/1971  Fed. Rep. of Germany .............. 73/718

*Primary Examiner*—E. A. Goldberg
*Attorney, Agent, or Firm*—Gipple & Hale

[57] ABSTRACT

A capacitive pressure transducer comprising a pair of thin discs made from an insulator, a thin metal film metalized onto each of the discs and forming the plates of the capacitor, and means for bonding the two discs together such that the two metal films are opposite each other, the two metal films are separated by an open gap, and the two metal films are insulated one from the other. When pressure is applied to the discs, the discs are displaced thereby changing the capacitance of the pressure transducer.

10 Claims, 8 Drawing Figures

U.S. Patent  Dec. 4, 1979  Sheet 1 of 2  4,177,496
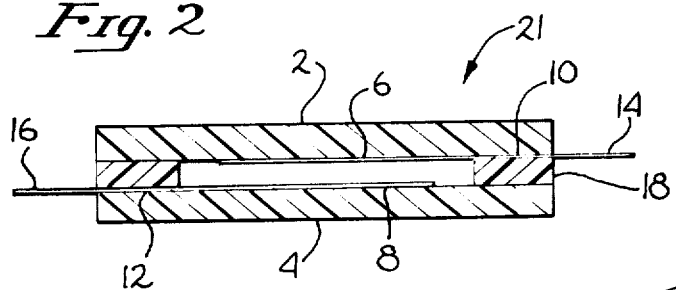
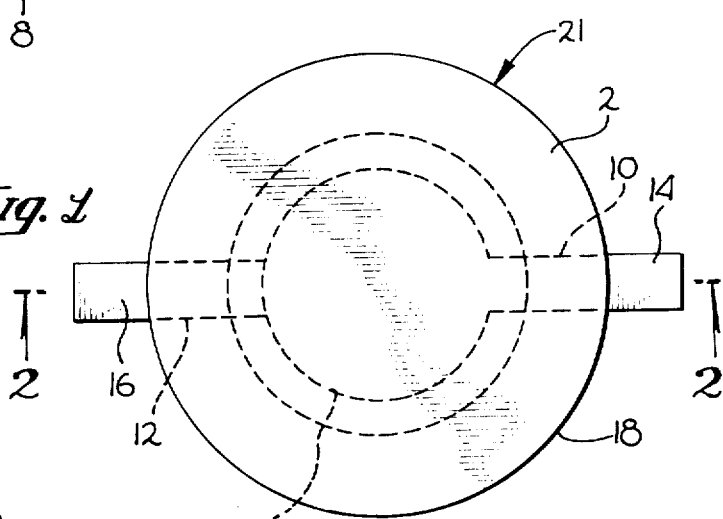
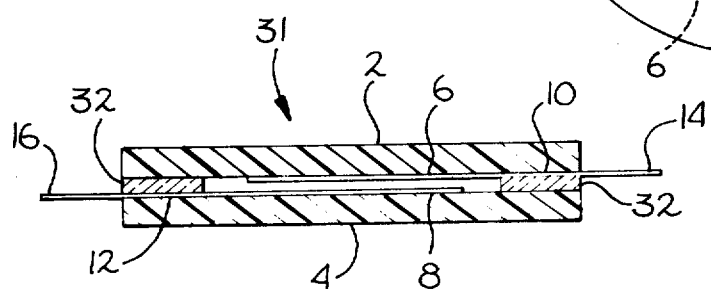
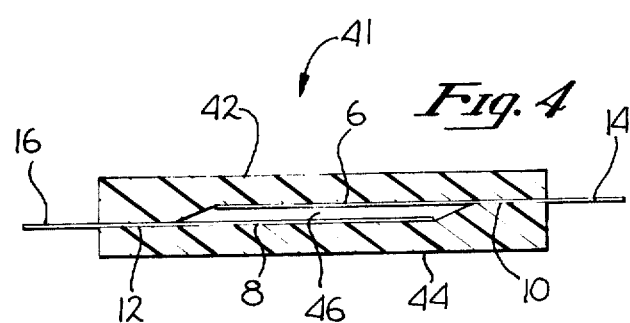
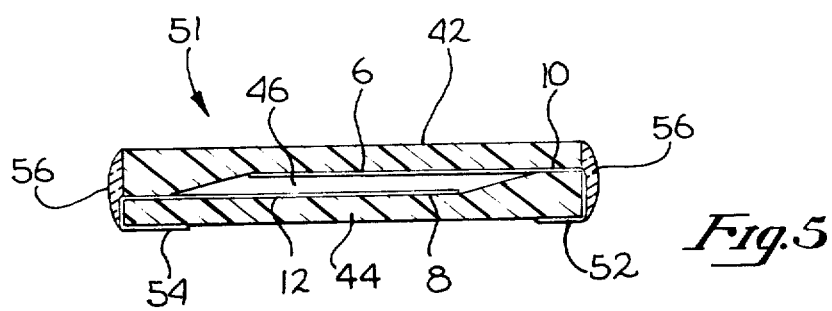

4,177,496

CAPACITIVE PRESSURE TRANSDUCER

This is a continuation of application Ser. No. 666,188, filed Mar. 12, 1976 now abandoned.

FIELD OF INVENTION

This invention relates to pressure transducers and more particularly to capacitive type pressure transducers utilized in conjunction with electronic circuits.

DESCRIPTION OF THE PRIOR ART

It is frequently necessary to determine the pressure of gases and liquids for purposes of measurement or control. Furthermore, it is also frequently necessary to provide means for sensing the pressure of fluids and gases in engines, machinery and equipment. Accordingly, there exists in the prior art many devices for measuring pressure. One type of such device uses the piezoelectric principle. When pressure is applied to the piezoelectric device, a voltage which is proportional to the pressure applied is generated by the device. While the piezoelectric device does allow one to measure pressure, it is best used only for measuring changes in pressure and not static pressure. Furthermore, piezoelectric devices are relatively insensitive and have a low accuracy.

Another device for measuring pressure is the strain gauge. Strain gauges are resistive devices wherein resistance changes in a manner related to the pressure applied thereto. Strain gauge devices can measure static pressure but there is a small percentage change for large pressure changes. Furthermore, strain gauges lack stability with temperature and time.

Another type of device is the resilient resistive materials which change resistance in proportion to the pressure applied thereto. Such devices also measure static pressure and are more sensitive than the piezoelectric devices but also lack stability with temperature and time.

There are also capacitive devices whose capacity varies with changes in pressure. These capacitive devices have better stability with temperature and time than devices previously discussed and are more sensitive than strain gauges, but such devices require a very complex manufacturing procedure and are very expensive. Furthermore, since such devices typically utilize different materials, there are problems created by the different rates of thermal expansion resulting in a lack of repeatability. Typical capacitive type devices are shown in U.S. Pat. Nos. 2,999,385 3,027,769 and 3,859,575.

Accordingly, it is a general object of the present invention to provide a capacitive pressure transducer which is easy to manufacture and low in cost.

It is another object of the present invention to provide a capacitive pressure transducer with high accuracy and stability over long periods of time and wide temperature ranges.

It is yet another object of the present invention to provide a capacitive pressure transducer which is very sensitive to changes in pressure.

It is still another object of the present invention to provide a simplified method for making a capacitive pressure transducer.

SUMMARY OF THE INVENTION

In keeping with the principles of the present invention the objects in one embodiment are accomplished with the unique combination of a pair of thin plates (e.g. discs) made from an insulating material, a metal film metalized onto each of the thin discs to form the plates of a capacitor and conductive areas accessible for lead attachment, and means for bonding the two discs together such that the two metal films are opposite each other, are separated by an open gap and are insulated one from the other. The plates function as diaphragms. In one embodiment the bonding means comprises a washer shaped spacer which is bonded to and separates the pair of discs. In another embodiment the bonding means comprises a glass type seal and the open gap is established by the sealing material. A third embodiment comprises a glass type seal and the open gap is established by the cross sectional shape of the pair of discs. In general the plates and the means for bonding are made from the same or substantially similar material.

When pressure is applied to the plates, the plates are displaced thereby changing capacitance of the pressure transducer. This change in capacitance can be detected by an electronic circuit and it is an indication of the value of the pressure applied to the capacitance pressure transducer.

BRIEF DESCRIPTION OF THE DRAWINGS

The above mentioned and other features and objects of the present invention will become more apparent by reference to the following description taken in conjunction with the accompanying drawings, wherein like reference numerals denote like elements and in which:

FIG. 1 is a top plan view of a capacitive pressure transducer in accordance with the teachings of the present invention;

FIG. 2 is a cross section of the embodiment of FIG. 1 taken along the 2—2 line;

FIG. 3 is another embodiment of a capacitive pressure transducer in accordance with the teachings of the present invention shown in cross section;

FIG. 4 is a third embodiment of a capacitive pressure transducer in accordance with the teachings of the present invention shown in cross section;

FIG. 5 is a fourth embodiment of a capacitive pressure transducer in accordance with the teachings of the present invention shown in cross section;

DESCRIPTION OF THE PREFERRED EMBODIMENT

Figure 6:
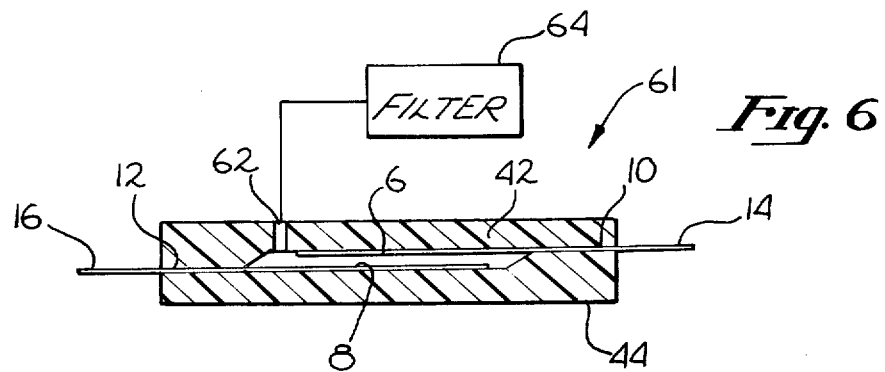
FIG. 6 is a fifth embodiment of a capacitive pressure transducer in accordance with the teachings of the present invention shown in cross section.

Referring more specifically to the drawings, FIGS. 1 and 2 are a first embodiment of a capacitive pressure transducer in accordance with the principles of the present invention.

In FIGS. 1 and 2, the capacitive pressure transducer includes two plates in the form of thin discs 2 and 4 made from a nonconductive or insulating material. Onto each of the discs 2 and 4 is metalized a thin central conductive layer 6 and 8. Central conductive layers 6 and 8 are substantially circular in shape. Another conductive layer 10 and 12 are metalized respectively onto each of the discs 2 and 4 and form a conductive path from the central layers 6 and 8 to the outer edge of discs 2 and 4. Leads 14 and 16 are coupled and electrically connected to conductive layers 10 and 12 respectively.

The capacitive pressure transducer 21 is now assembled by bonding one side of both discs 2 and 4 to a spacer 18 made from a nonconductive or insulating material such that the central conductive layers 6 and 8 are opposite each other and separated by a gap.

In practice discs 2 and 4 and spacer 18 may be made from any nonconductive material but the material selected for each part should be the same material or a substantially similar material. In the preferred embodiment the nonconductive or insulating material is preferably one which has approximately a zero hystersis, such as alumina, fused silica, or glass such as Pyrex. The term "zero hystersis" or "approximately zero hystersis" as employed in this specification means a minimum or negligible effect with respect to the particular application. Furthermore, the conductive layers may be plated on, etched on, sputtered on, screened on and fired, or applied in any other manner well known in the art. Furthermore, since in some applications an absolute pressure measurement is required, the gap between conductive layers 6 and 8 which form the plates of the capacitor may be evacuated. Also discs 2 and 4 can be bonded to spacer 18 by applying a small amount of glass frit between each of the three pieces and firing the assembled pressure transducer to fuse the glas frit thereby forming a seal. In a preferred embodiment, the conductive layers are screened onto the discs 2 and 4 using a conductive paste and a small amount of sealing material applied between the discs 2 and 4 and spacer 18. The sealing material is preferably a glass frit but may be a ceramic based sealing material. The thus assembled pressure transducer is then fired to complete the assembly.

In operation when pressure is applied to the capacitive transducer 21, one or both discs act as diaphragms and the spacing between the discs changes. When the two discs are displaced the capacitance of the transducer changes. Hence the capacitance changes as a function of pressure and the transducer can be calibrated such that any specific capacitance equals some specific pressure applied to the transducer. The change in capacitance can be measured by many of several different types of electronic circuits which exist in the art. One of such devices is an A.C. Wheatstone reactance bridge which is well known in the art.

In FIG. 3 is shown another embodiment of a capacitance pressure transducer in accordance with the teachings of the present invention. The embodiment of FIG. 3 is similar to that shown in FIG. 1 and 2 and accordingly is only shown in cross section. In FIG. 3 like reference numerals denote like elements of the embodiment of FIGS. 1 and 2.

In FIG. 3 central conductive layers 6 and 8 of substantially circular shape are applied onto the discs 2 and 4. Also conductive layers 10 and 12 are applied respectively onto each of the discs 2 and 4 and form a conductive layer from the central layers 6 and 8 to the outer edge of discs 2 and 4. Similarly leads 14 and 16 are coupled respectively to conductive layers 10 and 12.

The capacitance pressure transducer 31 is assembled by applying a glass frit (or ceramic sealing material) 32 in the vicinity of the perimeter of the surface(s) of disc(s) 2 and/or 4 onto which central conductive layer(s) 6 and/or 8 was previously applied. Disc 2 is then placed on top of the disc 4 with conductive layer 6 opposite conductive layer 8 separated by a gap. The initially assembled capacitive pressure transducer 31 is now fired thereby fusing the glass frit 32. When the glass frit 32 is fused, discs 2 and 4 are not only bonded together but also a seal is formed around the periphery between them. Furthermore, in this embodiment, a spacer such as the spacer 18 in the embodiment of FIGS. 1 and 2 is not required thereby reducing the number of components required to assemble the pressure transducer 31.

As in the embodiments of FIGS. 1 and 2, the preferred material for discs 2 and 4 is a zero hysteresis nonconductive electrically insulative, elastic material such as alumina, fused silica, or glass such as pyrex. Furthermore, in the preferred embodiment of the pressure transducer 31, the conductive layers are screened and fired onto the discs 2 and 4 using a conductive paste and then a glass frit is applied about the perimeter of disc(s) 2 and/or 4. Disc 2 is then placed on top of disc 4 and the thusly assembled pressure transducer is then fired to complete the assembly. Alternatively, the conductive layers 6, 8, 10, and 12 could be applied to discs 2 and 4 and glass frit 32 applied to one or both discs. The complete assembly could then be fired to seal the assembly.

In FIG. 4 is shown a third embodiment of a capacitive pressure transducer in accordance with the teachings of the present invention. The embodiment of FIG. 4 is similar to that shown in FIGS. 1 and 2 and accordingly is only shown in cross section. In FIG. 4 like reference numerals denote like elements to the embodiment of FIGS. 1 and 2.

In FIG. 4 the capacitive pressure transducer 41 includes two nonconductive insulative plates (e.g. discs) formed such that when placed together a gap 46 of substantially circular cross section exists between the plates 42 and 44. Circular conductive layers 6 and 8 are applied onto the inside surfaces of plates 42 and 44. Also conductive layers 10 and 12 are applied respectively onto each of the plates 42 and 44 and form a conductive layer from the central layer 6 and 8 to the outer edge of plates 42 and 44. Leads 14 and 16 are coupled respectively to conductive layers 10 and 12.

The capacitive pressure transducer 41 is now assembled by applying a small amount of glass frit about the perimeter of the inner surface of plate 44. Plate 42 is then placed on top of plate 44 with conductive layer 6 adjacent to and opposite conductive layer 8. The initially assembled capacitive pressure transducer 41 is then fired thereby fusing the glass frit. When the glass frit is fused, plates 42 and 44 are bonded together by a thin glass seal around the perimeter. Again, in this embodiment, a spacer such as spacer 18 in the embodiment of FIG. 1 is not required. Furthermore, only a very thin glass seal is made between the two materials and not the large seal shown in the embodiment of FIG. 3. Typically the thickness of the seal is in the order of one micro inch to one milinch.

As in the other embodiments, the preferred material for plates 42 and 44 is a zero hystersis, nonconductive electrically insulative elastic material such as alumina, fused silica or glass such as pyrex. Furthermore, in the preferred embodiment for pressure transducer 41 the conductive layers are applied onto the plates 42 and 44 using a conductive paste and then a small amount of glass frit is applied in the vicinity of the perimeter of plate 44. Plate 42 is then placed on top of plate 44 and the thusly assembled pressure transducer is then fired to join the two plates and fuse the glass frit to form a seal.

Furthermore, it should be apparent to one skilled in the art that the shape of the plates 42 and 44 can take any number of forms so long as the gap 46 between the inside surfaces of the plates 42 and 44 is provided. Typically, the plates 42 and 44 may be formed so that they are thicker on one edge than another, as shown in the drawings (FIG. 4 and FIG. 5), or could be formed in the shape of a dish, concave surface, or a shape essentially the same as the deflection curve of the plate(s) or disc(s) under pressure.

In FIG. 5 is shown a fourth embodiment of a capacitive pressure transducer in accordance with the teachings of the present invention. The embodiment of FIG. 5 is similar to that shown in FIGS. 1 and 2 and FIG. 4 and accordingly is only shown in cross section. In FIG. 5 like reference numerals denote like elements to the other embodiments.

In FIG. 5, the plates 42 and 44, conductive layers 6, 8, 10 and 12 are formed substantially as previously described. Leads 52 and 54 are coupled to conductive layers 10 and 12.

To assemble the capacitive pressure transducer 51, the plates 42 and 44 are placed one on top of the other with conductive layers 6 and 8 adjacent and opposite each other. The leads 52 and 54 are applied around plate 44 such that electrical contact points are available on the bottom surface of plate 44. A glass frit 56 is then applied to the outside edge of the disc and the combination is then fired to fuse the glass frit. It should be noted that it is within the scope of the invention to extend leads 52 and 54 downwardly along the side of plate 44 and side braze the leads 52 and 54 to conductors 10 and 12. The variant would have application primarily where square or rectangular plates were employed.

In FIG. 6 is shown a fifth embodiment of a pressure transducer in accordance with the teachings of the present invention. The embodiment of FIG. 6 is similar to that shown in FIG. 4 and accordingly is shown only in cross section. In FIG. 6 like reference numerals denote like elements to the other embodiments.

In FIG. 6, the plate 42 is provided with a vent hole 62 for venting the interior of the capacitive pressure transducer to the outside ambient pressure media. Vent hole 62 is vented to the outside media via a filter 64. In this way contaminants are prevented from entering the gap between the plates 6 and 8. In all other ways capacitive pressure transducer 61 is made assembled and operates in substantially the same way as the capacitive pressure transducer 41 in FIG. 4. It should be appreciated that the capacitive transducer may measure either gauge pressure or absolute pressure depending upon the requirement of the particular use. Further in practice, in some practical applications the ambient media might be air, oil or other media.

Figure 7:
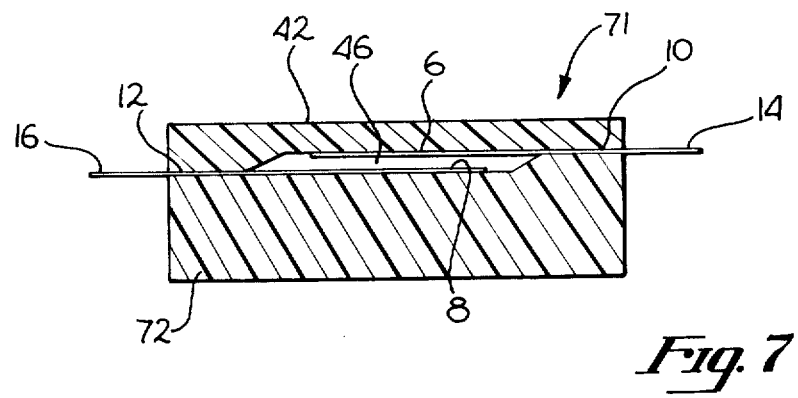
FIG. 7 is a sixth embodiment of a capacitive pressure transducer in accordance with the teachings of the present invention shown in cross section.

In FIG. 7 is shown a sixth embodiment of a capacitive pressure transducer in accordance with the teachings of the present invention. The embodiment of FIG. 7 is similar to that shown in FIG. 4 and accordingly is only shown in cross section. In FIG. 7 like reference numerals denote like elements to the other embodiments.

In FIG. 7 the capacitive pressure transducer 71 includes two nonconductive insulative, plates formed such that when placed together a gap 46 of substantially circular cross section exists between the plate 42 and cylindrical plate 72. Cylindrical plate 72 is formed such that it is substantially thicker than plate 42. Circular conductive layers 6 and 8 are applied onto the inside surfaces of plate 42 and cylindrical plate 72. Also conductive layers 10 and 12 are applied respectively onto each of the plates 42 and cylindrical plate 72 and form a conductive layer from the central layer 6 and 8 to the outer edge of plates 42 and 72. Leads 14 and 16 are coupled respectively to conductive layers 10 and 12.

The capacitive pressure transducer 71 is now assembled in a manner substantially the same as capacitive pressure transducer 41 in FIG. 4.

In operation, since cylindrical plate 72 is substantially thicker than plate 42, only plate 42 acts as a diaphragm. In other words, when pressure is applied to the capacitive pressure transducer 71, only plate 42 and accordingly layer 6 is displaced relative to layer 8 thereby varying the capacitance.

Figure 8:
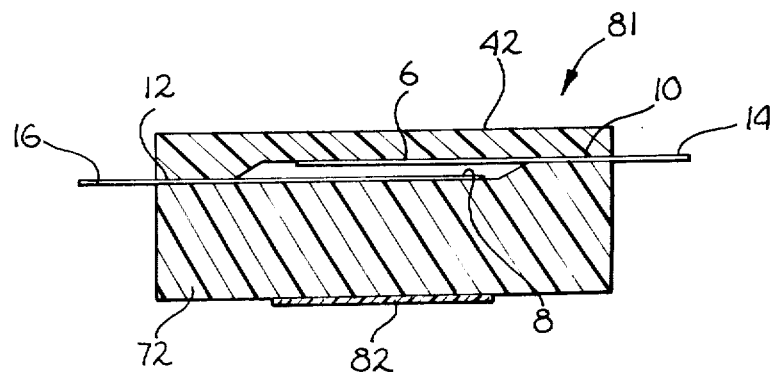
FIG. 8 is the capacitive pressure transducer of FIG. 7 provided with an electronic circuit.

In FIG. 8 like reference numerals denote like elements to the embodiment of FIG. 7. In FIG. 8 is shown a capacitive pressure transducer 81 substantially the same as that shown in FIG. 7 except that the capacitive pressure transducer 81 is provided with a hybrid circuit 82.

The cylindrical plate 72 is provided on its outside surface with a hybrid circuit 82. Hybrid circuit 82 may be manufactured separately and bonded to cylindrical plate 72 or may be deposited directly onto cylindrical plate 72 utilizing it as a substrate. The hybrid circuit may be located on any surface having sufficient available area. In some application, it may be desirable to form the hybrid circuit adjacent to the capacitor plate formed on cylindrical plate 72. Thus, the hybrid circuit would be sealed and protected in applications wherein the capacitive chamber was not vented.

In the above described embodiments of the capacitive pressure transducer, gaps between the plates on the order of 0.1 milinches to 20 milinches are practical. Typically the deflecting portion of the plates when made from alumina has a thickness ranging from approximately 0.001 to 0.500 inches. Furthermore, the thickness of the plates and the width of the gap can be designed such that under high overload pressures the two discs bottom out against each other thereby preventing damage to the pressure sensor. Also it should be apparent to one skilled in the art that the physical shape of the plates is not determinative of the invention and that the pressure transducer could be just as easily made from square or rectangular plates of a nonconductive or insulating material. Furthermore, the central conductive layer need not be circular and also could be square, rectangular or any other shape required. In addition, the lead position in the embodiment of FIG. 5 may be changed such that the leads are disposed on opposite surfaces of the capacitive pressure transducer.

In all cases it is understood that the above described embodiments are merely illustrative of but a small number of the many possible specific embodiments which can represent applications of the principles of the present invention. Numerous and various other arrangements can be readily devised in accordance with these principles by those skilled in the art without departing from the scope of this invention.

I claim:

1. A capacitive pressure transducer comprising, in combination, a pair of essentially zero hysteresis nonconductive electrically insulative members, at least one of said electrically insulative members comprising an elastic diaphragm defining a substantially planar inner surface and having a continuous solid cross-section, the other of said electrically insulative members defining a substantially planar inner surface and having a substantially continuous solid cross-section, said electrically insulative members being disposed in vertically aligned, stacked relationship with marginal edge portions in overlying relationship and with said inner surfaces in spaced apart parallel relationship to define a gap, seal means comprising a fired glass frit having a thickness ranging from about 0.1 milinch to 20 milinch bonding said overlying edge portions together in sealed relationship having a predetermined spacing and fixing said electrically insulative members in a parallel relationship, said frit and insulative members being of substantially similar materials from the standpoint of coefficient of thermal expansion, a planar layer of conductive material secured on each of said inner surfaces, each of said layers of conductive material comprising a central conductive portion and a co-planar conductive path portion extending from said central portion for connection to external leads, said central conductive portions on said inner surfaces being disposed in vertically aligned, spaced apart parallel relationship to form a capacitor having a capacitance which varies according to the substantially transverse flexing of said elastic diaphragm toward the other member in response to pressure, with the gap being dimensioned between 0.1 milinches to 20 milinches and the diaphragm being constructed to enable said diaphragm to bottom out when a pressure in excess of a predetermined pressure is applied to the transducer so as to avoid damaging stress on said transducer.

2. A pressure sensor for use over a predetermined pressure measurement range in environments subject to periodic high overload pressure comprising:

first and second ceramic insulating plates with a continuous solid cross-section having flat opposed surfaces;

thin electrically conductive layers formed on said insulating plates opposed surfaces and facing one another;

means for establishing an open gap between said flat conductive layers having a predetermined spacing between 0.1 milinches and 20 milinches, said means comprising fused glass frit between said two plates, said fused glass frit also hermetically sealing the space between said plates to form a sealed chamber holding a gaseous dielectric, said frit and insulating plates being of substantially similar material relative to thermal expansion; and means including said plates and said fused glass frit for permitting said plates to deflect toward one another without touching throughout said predetermined measurement range and to permit said plates to engage one another and bottom out under high overload pressure conditions, so that said transducer is protected against damage caused by extreme deflection of said plates and an electronic circuit means mounted on the outside surface of one of said plates.

3. A capacitive pressure transducer as claimed in claim 1 wherein said gap is vented to the outside media through one of said members.

4. A capacitive pressure transducer as claimed in claim 1 wherein one of said members defines at least one vent aperture allowing communication of said gap with the outside media.

5. A capacitive pressure transducer as claimed in claim 1 wherein said pair of essentially zero hysteresis non-conductive electrically insulated members are disc shaped.

6. A capacitive pressure transducer as claimed in claim 3 wherein said gap is vented to the outside media by way of a filter.

7. A pressure sensor as claimed in claim 2 wherein said gap is vented to the outside media through one of said members.

8. A pressure sensor as claimed in claim 7 wherein said gap is vented to the outside media by means of a filter.

9. A pressure sensor as claimed in claim 2 wherein one of said plates has a substantially continuous cross-section and defines at least one vent aperture allowing communication of said gap with the outside media.

10. A pressure sensor as claimed in claim 2 wherein said first and second ceramic insulating plates are disc shaped.

* * * * *